United States Patent Office 3,447,432
Patented June 3, 1969

3,447,432
CAMERAS
Karl Heinz Lange, 49 Holserstrasse, 498 Bunde-
Ennigloh, Westphalia, Germany
Filed Nov. 15, 1966, Ser. No. 594,438
Claims priority, application Germany, Nov. 16, 1965,
B 84,522
Int. Cl. G03b 19/04
U.S. Cl. 95—11          15 Claims

ABSTRACT OF THE DISCLOSURE

A camera for either daylight or flash light exposures, using a flash-bulb unit with preferably four flash-bulbs, the unit being held in a socket. A step mechanism for the socket and the flash contacts are only operative by the shutter in the flash ranges, so that in case of a flash exposure the flash bulb unit is only advanced for making the camera ready for a subsequent flash or daylight exposure.

---

This invention relates to photographic cameras provided with an integral, multiple flash bulb unit.

It is well-known to provide a multiple flash bulb unit integrally with a camera. The unit with a socket and the relative contacts are built into the camera, the mechanism of the camera automatically bringing forward the next bulb of the flash unit after each shutter release.

The object of the present invention is to provide a simple mechanism for stepping on the flash unit, which has the advantage that exposures can be made with indirect flashes and that the flash unit can remain in the camera when making an exposure without a flash.

For this purpose and according to the invention, the flash unit mounting which is rotatable as in the known arrangement is supported, together with the stepping-on mechanism by a rotary and essentially cylindrical receptacle in such a manner that an operating finger is engaging the camera mechanism in two operational positions, referred to herein as the "Direct flash" and "Indirect flash" positions. The rotary receptacle which receives the flash unit mounting comprises appropriate control cams or curves at some point for switching the camera shutter according to the selected operational position. However, provision may also be made for the mounting receptacle to be set by the movement of an adjustable shutter linkage, for example by using a rack or a toggle joint. A characteristic of one form of the invention consits in the flash unit occuping an anomalous angle to the direction of the flash, e.g. an angle of 45°, in "Daylight" operating position, this indicating to the user that the flash unit cannot be employed with the camera at that particular setting. The stepping-on mechanism is characterized by the small number of components it contains and it is extremely robust.

Figure 1:
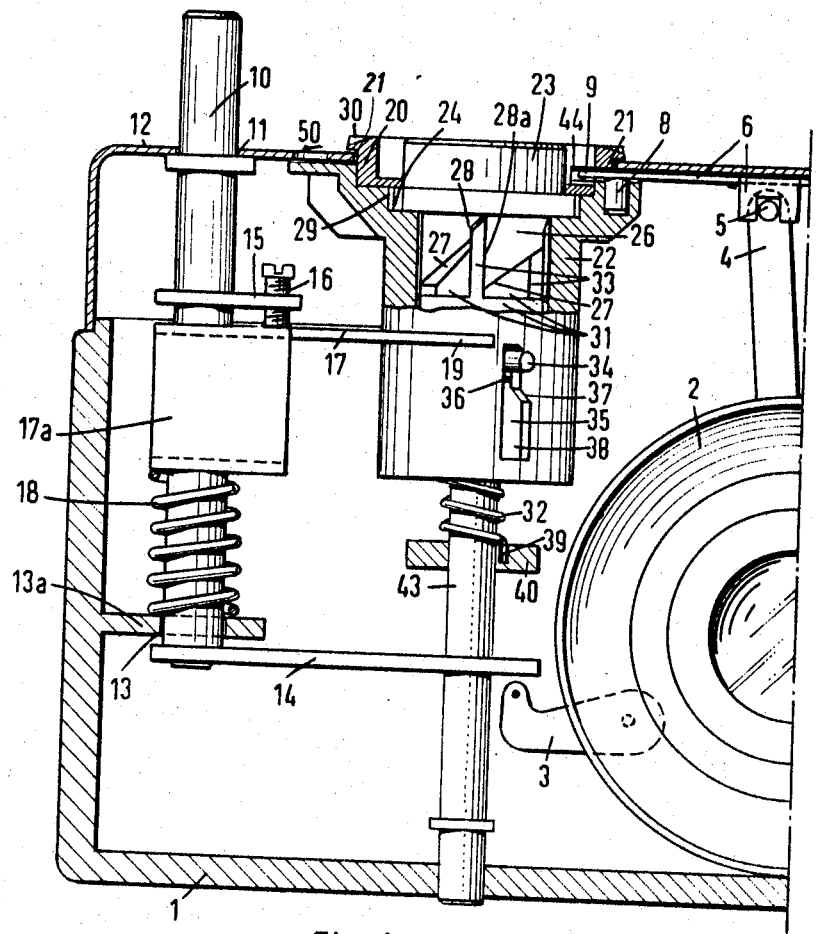
FIG. 1 represents the front view of a part section of a camera in the "Daylight" operating position.

As shown in FIG. 1, the usual ring 2 for adjusting the objective and shutter diaphragm is mounted in the camera body 1, the shutter to be released by means of a trigger 3.

A switch lever 4 serves for switching to the two flash ranges ("Direct-" and "Indirect-flash") mentioned above and to the "Daylight" range. This lever 4 is moved to and fro by a pin 5 which engages with a slide 6. The slide 6 (FIG. 3) is guided by a pin 7 in a slot 7a and also by another pin and slot, which are not shown. The slide 6 is provided with a pin 8 near its free end 9.

A shutter release member 10, mounted in a lateral position movably extends through an aperture 11 in a cover 12 of the camera body 1 and also through an aperture 13 of an internal extension 13a of camera body 1. A release finger 14 is attached to the lower end of the release member 10. The trigger 3 of the camera shutter is operated by pressing down the release member 10 (see FIG. 1). The release member 10 has attached thereto a tab 15 into which is screwed a setscrew 16. The setscrew 16 bears on an operating arm 17 which by a twice bent and bored part 17a is slidably attached to and extends from the release member 10 (see FIGS. 1 and 3) in such a manner that its position in relation to the release finger 14 can be adjusted by means of setscrew 16. Arm 17 is shaped at its end 19 to extend around partly the circumference of a receptacle 22 for the flash unit (FIG. 3) described fully below.

The lever 17 with its downwardly extending part 17a (FIG. 1) bears on a coil spring 18. The lever 17, the finger 14 and the release member 10 are all held in the upward position (FIG. 1) by the spring 18.

The receptacle 22 for a flash socket mount 23 is fitted into a bore 21 of the cover 12 by means of a masking and operating ring 20 and is secured in and to this ring either by adhesive or by means of screws.

The flash socket mount 23 has four register noses 24 (FIGS. 1 and 3) at its outer circumference, corresponding to the number of bulbs in the flash unit. A detent spring 25 co-operates with the noses 24, the spring 25 being clamped into a slot 25a of the mounting receptacle 22. At the lower end of mount 23 there are four cylindrical sections 26 (FIG. 1) with inclined surfaces 27 and vertical edges 28 and 28a, the whole being arranged in an annular manner. Mount 23 rotates with its noses 24 in a cylindrical recess 29 between the masking ring 20 and the mount receptacle 22. The outside of ring 20 has a knurl 30 for gripping and operating.

Figure 2:
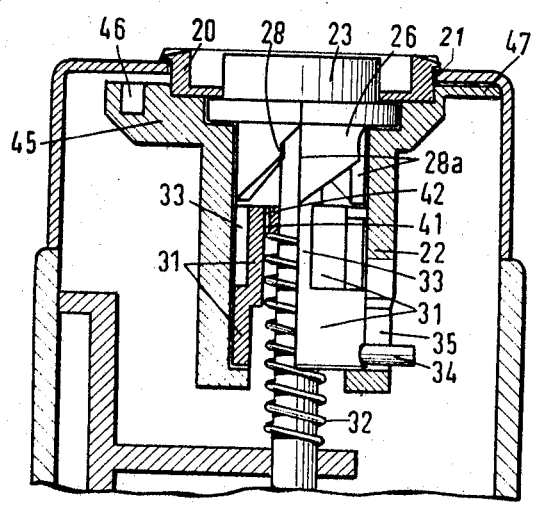
FIG. 2 represents a cross-section of one embodiment of the mounting receptacle in the flash position and at the moment of the flash being released.

An essentially cylindrical switch 31 (FIGS. 1 and 2), which also serves as a claw coupling, acts together with sections 26 and their (thread-type) inclined surfaces 27 and/or the vertical edges 28 and 28a. Switch 31 is pressed upwardly by a spring 32 and fits, together with four moulded fingers 33, into the spaces between the cylindrical sections 26, thereby being rigidly connected to mounting 23 (FIG. 1) by means of the vertical surfaces 28 and 28a.

A pin 34 is attached to switch 31 and extends through a slot 35 in the mount receptacle 22. The upper end 36 of slot 35 is just wide enough to accommodate pin 34. An inclined face 37 connects the upper part 36 with a broader part 38. Spring 32 at its lower end 39 is fixed into a housing 40. The upper end 41 is inserted into a bore 42 of the switch housing 31, so that it pivots slightly resiliently and presses on pin 34 in the direction of incline 37. In the centre of mounting 23, there is an ejector 43, held by spring 32 and housing 40, by means of which used flash bulb units can be ejected. At the same time, the ejector may be used to pivot receptacle 22 and switch body 31.

Figure 3:
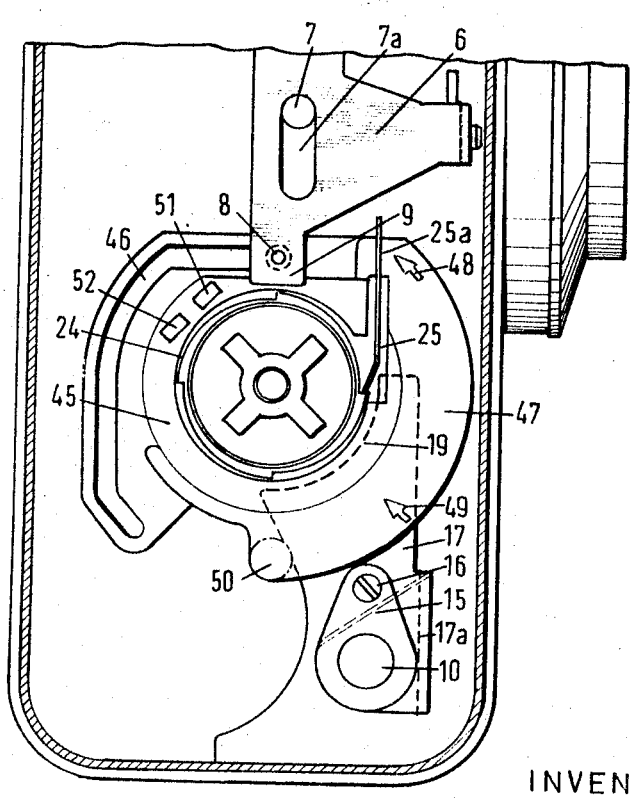
FIG. 3 represents a plan view of the camera of FIG. 1 with the cover partly cut away and the masking ring removed, in the "Daylight" operating position.

The masking ring 20 has a lateral recess 44 (FIG. 1) into which the end 9 of slide 6 extends and this recess 44 extends over a certain pivoting range. The receptacle 22 is provided with a flange 45 at its outside rim, as shown in FIG. 3. Flange 45 contains a curved lead recess 46, which determines the radial position of pin 9 in its three important setting positions. A flange 47, which is slightly raised, bears symbols 48 and 49, which can be observed through a window 50 (FIG. 1) in the cover 12, and which indicate the method of functioning of the flash in each operating setting. Two contacts 51 and 52 press resiliently against corresponding contacts of the flash unit and feed the required ignition current to the flash bulb selected. In the position as shown in FIGS. 1 and 3, contacts 51, 52 are not ready for flashing and are, further, not connected to the remaining electrical flash circuit of the camera by means of sliding contacts, the details of which have been left out. In this case, the camera is set for daylight exposure only.

If a direct or an indirect flash exposure is to be made with the camera, the user rotates the knurl 30 of masking ring 20, so that the receptacle 22, being rigidly connected to it together with switch body 31 and flash unit socket 23, moves and either symbol 49 on flange 47 appears in aperture 50 of cover 12 for indicating "Direct flash" or symbol 48 for indicating "Indirect flash." Now, flash socket mounting 23, as well as the pair of contacts 51, 52 are aligned and their contacts connected as required by the wanted forward or sidely direction of the flash. Simultaneously, by means of lead 46, slide 6 has been moved by pin 8, so that the end 9 of slide 6 has been removed from path of the flash socket to be inserted and it is now possible to either insert or take out a flash bulb, the camera shutter being set for the corresponding flash function by means of pin 5 and lever 4.

Further, pin 34, which is rigidly connected to switch body 31, is rotated into alignment below the end 19 of lever 17. When the release member 10 is pressed down, the operating arm 17 is also pressed down. The end 19 of lever 17 depresses pin 34 and this movement is transmitted to switch body 31, against the action of spring 32. As spring 32 is fixed to bearing 40 and to bore 42 of the switch body 31 by means of its ends 39 and 41, in such a manner that the switch body 31 receives a slight torsion in the direction of (adjacent next) incline 37 of receptacle 22, and if the release member is kept pressed down, the point in which the four fingers 33 of switch housing 31 can pass the vertical edges 28a of sections 26 of the flash unit mounting 23 will now be reached, as pin 34 has the required freedom to move within the range 38 of slot 36.

It is necessary that this moment of passage should synchronise with the shutter release.

Setscrew 16 is used to adjust this, as required. When the shutter release member 10 is released and moved upwards by spring 18, pin 34 and switch body 31 are released, spring 32 pressing them both upwards and the four pins 33 rotating the flash socket mounting 23 by 90° by abutment on the adjacent inclined surfaces 27. When the switch housing ascends further, pin 34 slides into its initial position again along incline 37. When the switch body has reached its upper position, the four pins or fingers 33 are within the range of edges 28 also, thus providing a safe alignment and swivel lock for the flash socket mounting together with edges 28a and the narrow section of slot 36. The detent spring 25 together with stepping noses 24 serve the purpose of preventing the flash socket mounting 23 from being reversed when pin 34 leaves the narrow section of slot 36, the torsion of spring 32 thus becoming effective.

If the flash unit is to be left on the camera when flash exposures are not required, the free end 9 of slide 6 can be dispensed with. As the flash unit already takes up an anomalous position (45°) in the daylight exposure position, errors will in any case be excluded. However, the user in between two flash exposures will then be able to make daylight exposures without removing the flash unit. This can be regarded as an advantage, by reason of the procedure for re-inserting a partly used flash unit being generally looked at as a complication, owing to the fact that the unit must be inserted in a certain manner to enable flashing to take place effectively.

I claim:

1. A camera (1) with daylight and at least one flash-light illumination-range having a trigger (3) and a manually operated exposure release control member (10) adapted to activate said trigger (3), said camera (1) having means (2, 4, 6, 8, 9) for adjusting the exposure conditions of said camera (1) according to a selected illumination range and a receptacle (22) adapted to be adjusted to a selected range, said camera comprising a flash socket mount (23) stepwise rotatably mounted within said receptacle, including selecting contacts (51, 52) for connecting a selected flashbulb with an ignition circuit, and drive means (26–33) for stepwise rotation of said flash socket mount (23) within said receptacle (22), said drive means comprising connecting means (34, 19) interruptable for said daylight range, between said drive means (26–33) and said trigger (3) and said manually operated control member (10), said connecting means being effected upon operation and release of said manually operated control member (10) for selection of a flashbulb of said unit within a flash range only.

2. A camera as claimed in claim 1 in which said drive means (26–33) comprises a switch member (31) loaded by a spring (32) and mounted for reciprocating movement axially of said rotatable flash socket mount (23), said switch member (31) being urged in a rotational sense also by said loading spring (32), said receptacle (22) being in the form of a slotted (35) sleeve surrounding said socket mount (23) and said switch member (31), a pin (34) being fixed to said switch member (31) and extending outwardly through said slotted sleeve thereby restraining rotation of said switch member (31), the slot (35) of said slotted sleeve having a narrow part (36) and a wider part (38) joined by a face (37) inclined in the rotational sense, an arm (17) being attached to said manually operated control member (10) adapted to engage said pin (34) in at least one arbitrary position of rotational alignment of said pin (34) and said receptacle (22) to move said pin (34) from the narrow slot part (36) to the wider slot part (38) when said control member (10) is operated and to permit the return of said pin (34) from said wider part (38) to said narrow part (36) when said control member (10) is released, thereby imparting a limited reciprocating axial and rotational motion to said springloaded switch member (31) bearing faces being formed on said switch member (31), said faces aligned for engagement with cam faces (27, 28) formed on said rotatable flash-socket mount (23) for stepwise rotating of the latter (23) when said switch member (31) is reciprocatingly axially moved, said receptacle (22) being rotatably adjustable for rotating said pin (34) alternatively to a first position in engagement with said arm (17) and to a second position out of engagement with said arm (17).

3. A camera according to claim 2, said slotted sleeve (22) having a curve-shaped track (46) formed in said sleeve, a track follower (8) connected by a transmission (6, 4) with said exposure conditions adjusting means (2), said follower (8) engaging said track (46) and adapted for radial movement by rotational movement of said sleeve (22), and means (17, 34) operationally connecting said switch member (31) and said track follower (8) with said manually operated control member (10) whereby said switch (31) and contact means (51, 52) as well as exposure conditions adjusting means (2) are selectively set by rotation of said sleeve (22).

4. A camera as claimed in claim 1, in which said stepwise drive means (26–33) is adjustable with respect to the angle of stepwise rotation of said receptacle (22) together with said flash socket mount (23) for selectively adjusting a flash bulb of said unit in register with said pair of electrical contacts (51, 52) in one selected flash direction and to another position not in register with said pair of said electrical contacts and said one selected flash direction.

5. A camera according to claim 1, in which said receptacle (22) through transmission means (8, 6, 4) is connected to camera objective and shutter-mechanism control means (2) so that when said receptacle (22) is rotated, said control means (2) is adjusted according to the selected operational illuminating position.

6. A camera according to claim 1, in which the receptacle (22) has a masking ring integral with the receptacle and above the latter, said receptacle being rotatably guided in an opening of the camera cover, said receptacle and said stepwise rotating means (26–33) being pivoted on an ejector which is axially slidable for ejecting said flash unit after use.

7. A camera according to claim 2, in which a blocking nose (9) is provided connected to a rack mechanism (8, 6, 4) connecting said receptacle (22) with said exposure adjusting means (2), the nose making it impossible to have a flash inserted in the daylight exposure range position.

8. A camera according to claim 2, in which in the daylight exposure position said flash unit is arranged for assuming an anomalous position in relation to the normal flash directions.

9. A camera according to claim 2, and sliding contacts (51', 52', 52'', 52''') arbitrarily connecting said electrical contacts (51, 52) with the camera flash circuit upon rotation of said receptacle (22) whereby said electrical contacts (51, 52) serve simultaneously for location and for engagement in the operational illumination range positions.

10. A camera according to claim 9, further having an arm (17) connected to said exposure release control member (10) and a switch body (31) having a pin (34), said arm (17) acting in the flash positions on said pin (34) said switch member (31) subject to axial and torsional elasticity, said switch body (31) having coupling fingers (33), said switch member upon exposure release being uncoupled from said release control member (10) and coupled with said flash socket mount (23), said arm moving said mount into a new location with the aid of said cam faces (27, 28) of said socket mount (23) and said switch member (31) by means of the torsional force of said spring (32) when said release control member (10) is released.

11. A camera according to claim 10, said slot (35) of said receptacle (22) having an extension (38), the torsional movement of said switch member (31) being held in the release position by means of said extension (38) of said slot (35) of said receptacle (22) and said follower pin (34) being held in said extension, the return of said switch member (31) to the initial position with respect to said receptacle (22) being performed by said inclined surface (37) between the slot sections (36, 38).

12. A camera according to claim 10 and a curve-shaped track (46) connecting transmission means (6, 4) for adjusting the camera exposure conditions according to the selected illumination range, said transmission means having a slide (6) connected to said pivoting receptacle (22) said transmission means being changed by a follower pin (8) moving along a guide track of said receptacle (22).

13. A camera according to claim 11, wherein said cam surfaces includes inclined surfaces (27) and adjacent vertical edges (28, 28a), said coupling fingers (33) of said switch member (31) keeping said flash unit locked against pivoting in the resting position by said laterally adjacent edges of said flash unit socket (23), said receptacle (22) interacting with said follower pin (34) held in the slot of said receptacle (22) while being released when said release is operated.

14. A camera according to claim 5, wherein said transmission means includes a rack mechanism (6, 4) between said adjusting means (2) for objective-and shutter-diaphragm-adjusting and said receptacle (22) so that in lieu of knurled mounting ring (20) of said receptacle (22) switching to another illumination range can be effected by manually actuating said adjusting means (2).

15. A camera (1) with exposure release control member (10) and with setting means (20) for both daylight and for at least one flashlight illumination range, said camera (1) further having means (2) operated by said range setting means (20) for adjusting the exposure conditions according to the selected illumination range, a flash socket mount (23) being arranged for inserting a flash unit with a plurality of flash bulbs, drive and stepwise rotating switch means (31) being provided for advancing stepwise said socket mount (23) and preparing the bulbs for subsequently igniting for flash exposures, connecting means (34, 19) provided between said control member (10) and said stepwise rotating switch means (31), said connecting means (34, 19) governed by said range setting means (20) and actuated only in every flash range but released in the daylight range.

References Cited

UNITED STATES PATENTS 3,353,467   11/1967   Ernisse et al. _____ 95—11.5

NORTON ANSHER, *Primary Examiner.*

CHARLES E. SMITH, *Assistant Examiner.*